United States Patent [19]

Ward

[11] Patent Number: 4,672,104
[45] Date of Patent: Jun. 9, 1987

[54] TWO STAGE POLYBENZIMIDAZOLE PROCESS AND PRODUCT

[75] Inventor: Bennett C. Ward, Pineville, N.C.

[73] Assignee: Celanese Corporation, New York, N.Y.

[21] Appl. No.: 704,227

[22] Filed: Feb. 22, 1985

Related U.S. Application Data

[63] Continuation-in-part of Ser. No. 645,952, Aug. 31, 1984, Pat. No. 4,588,808.

[51] Int. Cl.$^4$ ............................................. C08G 73/18
[52] U.S. Cl. ................................... 528/336; 528/341; 528/342; 528/337
[58] Field of Search ............... 528/186, 342, 337, 336, 528/341

[56] References Cited

U.S. PATENT DOCUMENTS

| | | | |
|---|---|---|---|
| 3,408,336 | 10/1968 | Benson | 528/342 |
| 3,448,687 | 5/1984 | Wang | 528/342 |
| 3,551,389 | 12/1970 | Prince | 528/186 |
| 4,463,167 | 7/1984 | Choe | 528/337 |
| 4,483,977 | 11/1984 | Conciatori | 528/342 |
| 4,588,808 | 5/1986 | Ward | 528/337 |

*Primary Examiner*—C. Warren Ivy
*Attorney, Agent, or Firm*—Forrest D. Stine

[57] ABSTRACT

A two stage process for the production of polybenzimidazoles is provided wherein an aromatic tetraamine, e.g., 3,3',4,4'-tetraaminobiphenyl, is reacted with a dicarboxylic component consisting of at least one compound having the formula:

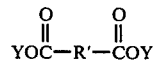

in which R' is a divalent organic radical and may be the same or different in the various molecules making up the dicarboxylic component and the Y's may be the hydrogen, aryl or alkyl, with no more than 95% the Y's being hydrogen or phenyl. The reactants are heated with agitation in a first stage to a temperature above the melting point of the tetraamine until the viscosity of the mixture rises as indicated by an agitator torque of at least 1.5 times that before the rise in viscosity. The agitation is then discontinued and the reaction mixture is allowed to foam while heating is continued. The foam is then allowed to cool to a friable mass and is crushed to a ground prepolymer which is heated with agitation in a second stage until the desired polymer is obtained. The invention also includes certain benzimidazole polymers as new composition of matter.

16 Claims, No Drawings

TWO STAGE POLYBENZIMIDAZOLE PROCESS AND PRODUCT

This application is a continuation-in-part of copending application Ser. No. 645,952 filed Aug. 31, 1984, now U.S. Pat. No. 4,588,808.

BACKGROUND OF THE INVENTION

The present invention provides a two-stage melt polymerization process for the production of high molecular weight polybenzimidazoles utilizing certain dicarboxylic compounds as monomers.

High molecular weight polybenzimidazoles are polymers of high thermal stability and excellent resistance to oxidative or hydrolytic degradation, which can be formed into shaped articles such as fibers and films having very desirable physical properties. As taught by the published literature, these polymers may be prepared, for example, by melt polymerizing an aromatic tetraamine and a diphenylester or an anhydride of an aromatic or heterocyclic dicarboxylic acid in a one or two stage process; see, for example H. Vogel and C. S. Marvel, Journal of Polymer Science, Vol. L, pages 511–539 (1961); and U.S. Pat. Nos. Re. 26,065; 3,174,947; 3,509,108; 3,551,389; 3,433,772; and 3,655,632. In particular, U.S. Pat. No. 3,551,389 discloses a two stage process for the production of aromatic polybenzimidazoles, in which the monomers are heated at a temperature above 170C. in a first stage melt polymerization zone until a foamed prepolymer is formed. The foamed prepolymer is cooled, pulverized, and introduced into a second stage polymerization zone where it is heated again to yield a polybenzimidazole polymer product.

It has also been known to prepare polybenzimidazoles from the free dicarboxylic acids or the methyl esters of such acids rather than the phenyl esters or anhydrides in a melt polymerization process. However, many of the early investigators of these polymers believed that inferior or unsatisfactory polymers resulted from the use of the free acid or the dimethyl ester as the monomer. Thus Vogel and Marvel state in their cited article that in attempting to prepare polybenzimidazoles from aromatic dioic acids or their dimethyl esters and aromatic tetraamines, "The use of the free acids and the corresponding dimethy esters gave inferior results." (page 513) Moreover, these same two investigators do not mention the free acids or dimethyl esters as monomers in their U.S. Pat. No. 3,174,947 in which polybenzimidazoles are disclosed and claimed, nor are the free acids or dimethyl esters mentioned as possible monomers in any of the other cited patents.

In addition to the melt polymerization process described in the foregoing references, a process of preparing polybenzimidazoles has been proposed in which good results are reported to be obtained using a free dicarboxylic acid or a dimethyl ester of such acid as monomer. This process involves the solution polymerization of an inorganic acid salt of an aromatic tetraamine and a dicarboxylic acid or a derivative thereof such as the dimethyl ester with heat in the presence of polyphosphoric acid; (see U. S. Pat. No. 3,313,783 and Iwakura et al, Journal of Polymer Science: Part A, Vol. 2, pages 2605–2515 [1964]). According to this process, the polymer product after completion of the reaction can be separated by pouring the reaction mixture in the form of a polyphosphoric acid solution into a large quantity of water. However, this separation procedure is complicated and, moreover, it is difficult to recover and reuse the polyphosphoric acid.

Despite the disadvantages of processes utilizing a free dicarboxylic acid or methyl, or other alkyl ester as monomer in the preparation of polybenzimidazoles, there are concomitant advantages to such use over the phenyl esters which are the most widely taught dicarboxylic acid derivatives for the preparation of these polymers. Thus, the free acid and alkyl esters are generally less expensive than the corresponding phenyl ester and their use does not result in the formation of free phenol as a by-product. Moreover, the formation of free phenol is undesirable because of toxicity problems and any expedient to eliminate or reduce such formation is considered beneficial. In view of this there have been attempts to develop processes which utilize a free acid as monomer and result in polymers which can be formed into shaped articles of commercial utility. For example, U.S. Pat. No. 4,312,976 discloses a single-stage process of preparing polybenzimidazoles from a free dicarboxylic acid as monomer, wherein the catalyst is an organic sulfonic acid, a halogenated acetic acid or a non-oxidizing inorganic acid. However, aside from being limited to a specific class of catalysts, this process results in a polymer mass of high viscosity requiring substantial agitation energy especially in the latter part of the polymerization process. Futhermore, the final polymer is in the form of a solidified mass which is difficult to handle and to dissolve in an appropriate solvent for forming into shaped articles such as fibers.

Copending application Ser. No. 645,952, filed Aug. 31, 1984, which is the parent of this application, discloses and claims a two stage process for the production of polybenzimidazoles using a free dicarboxylic acid as the dicarboxylic monomer component, which substantially eliminates the disadvantages of a one stage process utilizing the free acid described previously. However, this process as well as the previously known one stage processes usually results in the formation of water contaminated with tetraamine as a by-product which is difficult to dispose of. Thus, the replacement of at least part of the free acid with an alkyl ester, e.g. a methyl ester, results in at least part of the water being replaced by an alkanol such as methanol. This allows for easier disposal by combustion of the tetraamine-contaminated by-product.

Notwithstanding the disadvantages of the use of the phenyl esters and the advantages of the free acid and alkyl esters as previously pointed out, the use of a phenyl ester as part of the discarboxylic monomer component together with some free acid and/or alkyl ester may allow for the retention of some of the process advantages known to result from its use in one or two stage melt polymerization processes.

SUMMARY OF THE INVENTION

In accordance with one aspect of this invention, polybenzimidazoles are prepared by reacting in a two stage polymerization process at least one aromatic tetraamine containing two pairs of amine substituents on an aromatic ring, the amine substituents being ortho to one another, and a dicarboxylic component consisting of at least one compound having the formula

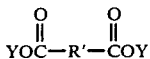

in which R' is a divalent organic radical more specifically defined hereinafter and may be the same or different in the various molecules making up the dicarboxylic component and the Y's may be hydrogen, aryl or alkyl, with no more than 95% of the total Y's in the various molecules making up the dicarboxylic component being hydrogen or phenyl considered separately. Certain of the polybenzimidazoles prepared using the foregoing combinations of monomers are new compositions of matter.

In the first stage of the process, the mixture of aromatic tetraamine and dicarboxylic component and, if desired, a polymerization catalyst is heated to condensation polymerization temperatures which are above the melting point of the aromatic tetraamine. Depending on the nature and melting point of the compound or compounds making up the dicarboxylic component, the resulting polymerizing mass is a liquid which may be a slurry of solid acid particles in melted tetraamine, or a homogeneous mixture of tetraamine and dicarboxylic component and or an emulsion comprising melted tetraamine and melted discarboxylic component. The heating is continued to between 230°-350° C. with concurrent strong agitation until the viscosity of the mixture rises to a point such that the agitator torque is above about 1.5 times, and generally no higher than about 6 times, the torque before the increase in viscosity begins to occur. The agitation is then terminated, and heating is continued while allowing the mass to foam to a friable mass. The resulting prepolymer is then cooled and ground to a powder which is heated in the solid state in a second polymerization stage at a higher temperature than the first stage until the desired degree of polymerization is achieved.

DETAILED DESCRIPTION OF THE INVENTION

The polybenzimidazoles which can be produced by the process of this invention are those having repeating units of the following formula:

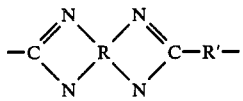

wherein R is a tetravalent aromatic nucleus with the nitrogen atoms forming the benzimidazole rings being paired upon adjacent carbon atoms, i.e., ortho carbon atoms, of the aromatic nucleus, and R' is a member of the class consisting of an aromatic ring; an alkylene group (preferably having 4 to 8 carbon atoms); and a heterocyclic ring such as pyridine, pyrazine, furan, quinoline, thiophene, and pyran. Depending on whether the dicarboxylic acid moieties in the dicarboxylic monomer component are the same or different, R' may be the same or randomly different among the repeating units along the polymer chain. Moreover, depending on whether one or more than one tetraamine monomer is utilized in the polymerization, R may also be the same or randomly different along the polymer chain.

The following generalized equation illustrates the condensation reaction which occurs in forming the polybenzimidazoles having the recurring units of the foregoing formula:

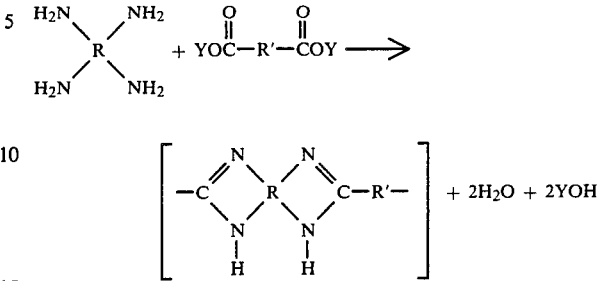

in which R, R' and Y are as previously defined. Such polybenzimidazoles are produced by the reaction of a mixture of (1) at least one aromatic tertraamine containing two groups of amine substituents, the amine substituents in each group being in an ortho position relative to each other, and (2) a dicarboxylic component as indicated in the foregoing equation and as more completely defined hereinafter.

Aromatic tetraamines which may be used, for example, are those with the following formulas:

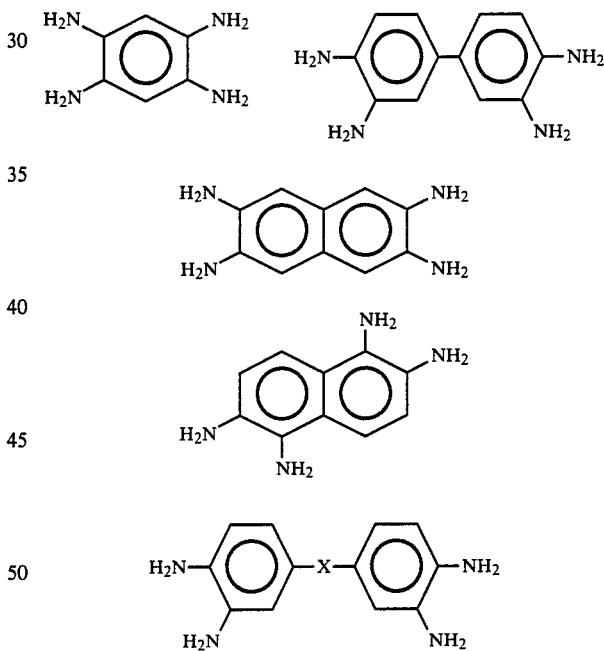

where X represents —O—, —S—, —SO$_2$, —C—, or a lower alkylene group, such as —CH$_2$—, —(CH$_2$)$_2$—, or —C(CH$_3$)$_2$3. Among such aromatic teteraamines may be mentioned, for example, 1,2,4,5-tetraaminobenzene; 1,2,5,6-tetraaminonaphthalene; 2,3,6,7-tetraaminonaphthalene; 3,3',4,4'-tetraaminodiphenyl methane; 3,3',4,4'-tetraaminodiphenyl ethane; 3,3',4,4'-tetraaminodiphenyl-2,2-propane; 3,3',4,4'-tetraaminodiphenyl thioether; and 3,3',4,4'-tetraaminodiphenyl sulfone. The preferred aromatic tetraamine is 3,3',4,4'-tetraaminobiphenyl.

The compounds which comprise the dicarboxylic component of this invention are defined by the formula:

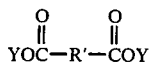

in which the Y's may be hydrogen, aryl or alkyl with no more than 95% of the Y's being hydrogen or phenyl. The dicarboxylic component may therefore consist of a mixture of a free acid with at least at one diester and/or monoester; a mixture of diester(s) and/or monoester(s); or a single dialkyl ester, monoester or mixed aryl-alkyl or alkyl/alkyl ester but cannot consist completely of free acid or diphenyl ester. When Y is alkyl, it preferably contains 1 to 5 carbon atoms and is most preferably methyl. When Y is aryl, it may be any monovalent aromatic hydrocarbon group obtained by filling with hydrogen all the valences but one of the aromatic groups which may be R or R' as disclosed previously, either unsubstituted or substituted with any inert monovalent radical such as alkyl or alkoxy containing 1 to 5 carbon atoms. Examples of such aryl groups are phenyl, naphthyl, the three possible phenylphenyl radicals and the three possible tolyl radicals. The preferred aryl group is usually phenyl.

The dicarboxylic acids which are suitable in free or esterified form as part of the dicarboxylic component as previously described for use in the production of polybenzimidazoles by the process of the present invention include aromatic dicarboxylic acids; aliphatic dicarboxylic acids (preferably, those having 4 to 8 carbon atoms); and heterocyclic dicarboxylic acids wherein the carboxylic groups are substituents upon carbon atoms in a ring compound such as pyridine, pyrazine, furan, quinoline, thiophene, and pyran.

The preferred dicarboxylic acids which may be utilized in free or esterified form as described are aromatic dicarboxylic acids such as those illustrated below:

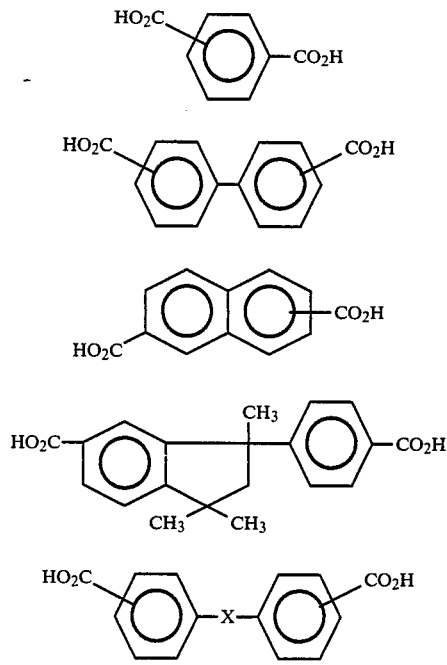

where X is as defined above. For example, the following diacids can suitably be employed: isophthalic acid; terephthalic acid; 4,4'-biphenydicarboxylic acid; 1,4-naphthalenedicarboxylic acid; diphenic acid (2,2'-biphenyldicarboxylic acid); phenylindandicarboxylic acid; 1,6-napthalenedicarboxylic acid; 2,6-naphthalenedicarboxylic acid; 4,4'-diphenyletherdicarboxylic acid; 4,4'-diphenylsulfonedicarboxylic acid; 4,4'-diphenylthioetherdicarboxylic acid. Isophthalic acid is the dicarboxylic acid which in free or esterified form is most preferred for use in the process of the present invention.

Preferably the dicarboxylic component is one of the following combinations: (1) at least one free dicarboxylic acid and at least one diphenyl ester of a dicarboxylic acid; (2) at least one free dicarboxylic acid and at least one dialkyl ester of a dicarboxylic acid, and (3) at least one diphenyl ester of a dicarboxylic acid and at least one dialkyl ester of a dicarboxylic; and (4) at least one dialkyl ester of a dicarboxylic acid. The dicarboxylic moieties of the compounds of each combination may be the same or different and the alkyl groups of the alkyl esters of combinations (2), (3) and (4) generally contain 1 to 5 carbon atoms and are most preferably methyl.

It is preferred to employ the dicarboxylic component in a ratio of about 1 mole of total dicarboxylic component per mole of aromatic tetraamine. However, the optimal ratio of reactants in a particular polymerization system can be easily determined by one of ordinary skill in the art.

Examples of polybenzimidazoles which may be prepared according to the process of the present invention include:

poly-2,2'-(m-phenylene)-5,5'-bibenzimidazole;
poly-2,2'-(biphenylene-2"2''')-5,5'-bibenzimidazole,
poly-2,2'-(biphenylene-4"4''')-5,5'-bibenzimidazole;
poly-2,2'-(1",1",3"trimethylindanylene-3"5"-p-phenylene-5,5'-bibenzimidazole;
2,2'-(m-phenylene)-5,5'-bibenzimidazole/2,2-(1",1",3"-trimethylindanylene) 5",3"-(p-phenylene)-5,5'-bibenzimidazole copolymer;
2,2'-(m-phenylene) -5,5- bibenzimidazole/2,2'-biphenylene-2",2''') -5,5'-bibenzimidazole copolymer;
poly-2,2'-(furylene-2",5")-5,5'-bibenzimidazole;
poly-2,2'-(naphthalene-1",6")-5,5'-bibenzimidazole;
poly-2,2'-(naphthalene-2",6")-5,5'-bibenzimidazole;
poly-2,2'-amylene-5,5'-bibenzimidazole;
poly-2,2'-octamethylene-5,5'-bibenzimidazole;
poly-2,2'-(m-phenylene)-diimidazobenzene;
poly-2,2'-cyclohexenyl-5,5'-bibenzimidazole;
poly-2,2'-(m-phenylene)-5,5'-di(benzimidazole) ether;
poly-2,2'-(m-phenylene)-5,5'-di(benzimidazole) sulfide;
poly-2,2'-(m-phenylene)-5,5'-di(benzimidazole) sulfone;
poly-2,2'-(m-phenylene)-5,5'-di(benzimidazole) methane;
poly-2,2"-(m-phenylene)-5,5"-di(benzimidazole) propane-2,2; and
poly-ethylene-1,2-2,2"-(m-phenylene)-5,5"-dibenzimidazole) ethylene-1,2 where the double bonds of the ethylene groups are intact in the final polymer

The preferred polybenzimidazole prepared by the process of the present invention is poly-2,2'-(m-phenylene)-5,5'-bibenzimidazole, the recurring unit of which is: where n is an integer in excess of 75. This polymer can be prepared in accordance with the process of the present invention by the reaction of 3,3',4,4'-tetraaminobiphenyl with a combination of isophthalic acid with diphenyl isophthalate or with a dialkyl isophthalate such as dimethyl isophthalate; a combination of diphenyl isophthalate and a dialkyl isophthalate such as dimethyl isophthalate; or at least one dialkyl isophthalate such as dimethyl isophthalate, as the sole dicarboxylic component.

The polymerization process of this invention can be carried out without a catalyst but it is preferable to have a catalyst present in order to increase inherent viscosity. Catalysts which may be used are, for example, phosphorus compounds such as triaryl phosphites and diaryl phosphites in which the aryl groups may be, for example, phenyl, tolyl and substituted phenyl wherein the substituents may be, for example, alkyl and alkoxy containing up to 4 carbon atoms, trialkyl phosphites wherein the alkyl groups contain up to 4 carbon atoms, triaryl phosphines wherein the aryl group may be phenyl, tolyl, naphthyl, fluorophenyl and methoxyphenyl, trialkyl phosphines, wherein the alkyl groups are propyl or butyl, halophosphines such as phenyldichlorophosphine, phosphorustrihalides, phosphorusoxy trihalides, magnesium, manganese and alkali methal hypophosphites, e.g. sodium hypophosphites, and triaryl phosphates, e.g. triphenyl phosphate; tin compounds such as m-butylstannoic acid, dibutyltin oxide, dibutyltin acetate, stannous chloride, stannic chloride, dibutyltin dilaurate, and stannous oxalate; silanes and siloxanes of the formula:

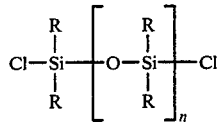

where R and R' may be the same or different and are methyl, phenyl or hydrogen and n is zero or an integer, e.g. up to 5, such as dimethyldichlorosilane, diphenyldichlorosilane, methylphenyldichlorosilane, and 1,3-dichloro-1,1,3,3-tetramethylsiloxane; organic sulfonic acids such as p-toluenesulfonic acid, benezenesulfonic acid, methanesulfonic acid, trifluoromethanesulfonic acid, and mixtures of the above, halogenated acetic acids as trifluoroacetic acid, and trichloroacetic acid, and mixtures of the above and non-oxidizing acids such as sulfuric acid, phosphoric acid, and hydrochloric acid. The preferred catalyst is triphenyl phosphite.

The process of the invention may be used to produce polybenzimidazoles of one or more aromatic tetraamines and one or more dicarboxylic acids. In general, stoichiometric quantities of the total tetraamine and dicarboxylic component are utilized.

If a catalyst is employed, it is present in an amount, for example, of about 1 to 6 mole %, preferably about 2 to 4 mole % based on the total tetraamine or dicarboxylic acid component.

The first stage of the process of the invention is carried out by heating the aromatic tetraamine, dicarboxylic component and catalyst, if used, with strong agitation to a temperature in the range of 230°–350° C. and preferably 280°–340° C. Depending on the melting point of the compounds of the dicarboxylic component and the chemical nature of the tetraamine and the dicarboxylic component, the liquid mass being agitated will be a slurry, a homogenous mixture or an emulsion of two immiscible liquids. When the viscosity of the reacting mass begins to rise as indicated by increased torque on the agitator manifested by increased energy of agitation, the agitation is discontinued and the mass heated further and allowed to foam. The point at which the agitation is discontinued is generally such that the agitator torque and energy of agitation has not risen above, for example, about 1000% of the initial torque or agitation energy after the tetraamine has melted, preferably not above about 300% such initial torque or agitation energy. The mass is then heated further without agitation to a temperature in the range, for example, of about 230° to 350° C., preferably about 280° to 340° C. Such heating is continued for a period of time in the range, for example, of about 0.25 to 3 hours and preferably about 0.5 to 1.5 hours. The foamed mass is then cooled to a temperature below its melting point, e.g. room temperature which causes it to set up into a solid friable mass which is easily crushed or ground. In general, the inherent viscosity of the prepolymer after the first stage is complete is in the range, for example, of about 0.05 to 0.3 dl/g, (All inherent viscosities were measured from a solution of 0.4% by weight of polymer in 97% sulfuric acid at 25° C.).

The ground prepolymer is then further heated with normal agitation in a second stage at a temperature, for example, of about 300° to 420° C., preferably about 360° to 400° C. for a period, for example of about 0.25 to 4 hours, preferably about 0.5 to 2 hours until the desired degree of polymerization is attained.

When poly-2,2'-(m-phenylene)-5,5'-bibenzimidazole is produced from 3,3', 4,4'-tetraaminobiphenyl and an isophthalic component using the monomers and process of this invention, the first stage may be carried out at a temperature, for example of about 230° to 350° C., preferably about 280° to 340° C. for a period of time, for example of about 0.25 to 3 hours preferably 0.5 to 1.5 hours.

The two stage process of this invention has processing advantages over one stage processes using a free dicarboxylic acid as monomer proposed previously in which the process is carried out with agitation until the viscosity increase overcomes the torque of the stir motor and locks and/or breaks the agitator. The solid polymer produced in this manner is generally in the form of a lump which is difficult to remove from the reactor and difficult to process into shaped articles such as fibers.

In addition to the processing advantages made possible by the two stage process of this invention, the process also results in polymers having relatively high inherent viscosities, which is an indication of molecular weight, and relatively high plugging values which is a filterability measurement indicating the amount of insoluble gels and insoluble solid particles present in the polymer.

In both stages of the process of the present invention, a pressure is employed preferably equal to at least atmospheric pressure, e.g., one to two atmospheres, and preferably atmospheric pressure. Such a pressure is commonly obtained by employing an open polymerization system provided with a condenser in order to remove the compounds which are produced as by-products of the reaction.

Both stages of the process are conducted in a substantially oxygen-free atmosphere. For example, an inert gas such as nitro- gen or argon can be continuously passed through the reaction zone during the polymerization. The inert gas employed should be substantially oxygen-free, i.e., contain less than about 20 p.p.m. of oxygen, preferably less than about 8 p.p.m., and more preferably, be oxygen-free. The inert gas is introduced into the reaction zone at a rate of flow measured at standard conditions, that is, atmospheric pressure and temperature, within the range of about 1 to 200 percent of the volume of the reaction zone per minute. The inert gas can be passed into the polymerization reaction zone at room temperature or, if desired, preheated to the reaction temperature.

The process of the present invention can be used to produce a high molecular weight polybenzimidazole product as indicated by relatively high inherent viscosity. Such products exhibit an inherent viscosity, for example, of at least about 0.4 dl/g when measured at a concentration of 0.4 g. of the polymer in 100 ml. of 97 percent $H_2SO_4$ at 25° C. Preferably, the polymer exhibits an inherent viscosity of at least about 0.5 dl/g, and the inherent viscosity is most preferably at least about 0.6 dl/g.

The following examples further illustrates the invention. The inherent viscosities mentioned in the examples were measured as a 0.4% solution in 97% concentrated sulfuric acid at 25 C. while the plugging values were measured by forming a 5% solution of the polymer in 97% sulfuric acid or a 6% solution in dimethyl acetamide containing 2% lithium chloride and filtering the solution at 25° C. and one atmosphere pressure through a Gelman Type A glass paper filter. The plugging value, which is the number of grams of polymer solution filtered per unit area in infinite time, is expressed in grams of polymer per square centimeter. A higher value indicates a polymer solution containing less gels and insolubles.

Examples I to IV illustrate the process of this invention used to prepare new benzimidazole copolymers by reacting a tetraamine with a combination of a free dicarboxylic acid other than isophthalic acid, and diphenyl isophthalate.

EXAMPLE I

Into a three-necked, one-liter, round bottomed flask equipped with a nitrogen inlet and outlet, a mechanical stirrer, and a condenser were placed 29.29 g (90.40 mmol) of phenylindan dicarboxylic acid (PIDA), also identified as 3-(4-carboxyphenyl)- 2,3-dihydro-1,1,3-trimethyl-1H-indene-5-carboxylic acid (Chemical Abstract Service registry number 3569-18-4), 28.75 g(90.41 mmol) of diphenyl isophthalate (DPIP), 38.68 g (180.8 mmol) of 3,3′4,4′-tetraaminobiphenyl (TAB) and 2.27 g (7.31 mmol) of triphenyl phosphite (TPP). The mol % ratio of PIDA to DPIP was 50:50 based on the total dicarboxylic component. The flask was degassed and filled with nitrogen and the degassing was repeated at least three times. The flask was then heated with an oil bath at 350° C./hr to 300° C. Stirring was maintained at 300 rpm until condensate evolution began to slow and the torque increased to 90-100 mV from a value before viscosity increase of 30 mV. The oil bath temperature was held at 300° C. for one hour during which time the foam height in the flask increased to 8 cm. from an initial height of reactants in the flask of approximately 1 cm. The resulting first stage product which had an inherent viscosity (IV) of 0.17 dl/g. was cooled to room temperature and then was ground. The ground prepolymer was placed in a flask, the degassing cycles described above were repeated, and the prepolymer was heated with stirring at 60 rpm at 380° C. for 1.5 hours. The resulting second stage polybenzimidazole had an inherent viscosity (IV) of 0.51 dl/g and a sulfuric acid plugging value (PV) greater than 5 $g/cm^2$. The isolated yield was 57.0 g or 82%.

EXAMPLE II

The procedure of Example I was followed except that a 75:25 mol % ratio of PIDA:DPIP was used. The weights were 43.91 g (135.5 mmol) PIDA and 14.38 g (45.22 mmol) DPIP. The resulting first stage polymer had an IV of 0.14 dl/g. The resulting second stage polymer had an IV of 0.45 dl/g and a sulfuric acid PV of greater than 5 g/cm. The isolated yield was 75.80 g or 98%.

EXAMPLE III

The procedure of Example I was followed except that a 67:33 mol % ratio of diphenic acid:DPIP was used. The weights were 21.86 g (90.37 mmol) diphenic acid (2,2′-biphenyldicarboxylic acid) and 28.76 (45.22 mmol) DPIP. The resulting first stage polymer had an IV of 0.23 dl/g. The resulting second stage polymer had an IV of 0.89 dl/g and a sulfuric acid PV of 0.06 g/cm.

EXAMPLE IV

The procedure of Example III was followed except that about a 75:25 mol % ratio of diphenic acid:DPIP was used. The weights were 30.80 g (127.3 mmol) diphenic acid and 14.37 g (45.19 mmol) DPIP. The resulting first stage polymer had an IV of 0.23 dl/g. The resulting second stage polymer had an IV of 0.79 dl/g and a sulfuric acid PV of 0.33 g/cm. The isolated yield was 54.8 g or 83%.

The polymers of Examples I and II are 2,2′-(m-phenylene) -5,5′-bibenzimidazole/2,2′-(1″,1″,3″-trimethylindanylene -5″, 3″-p-phenylene)-5 5′-bibenzimidazole copolymers, and the polymers of Examples III and IV are 2,2′- (m-phenylene) -5,5′-bibenzimidazole/2,2′-(biphenylene-2″,2‴) -5,5′-bibenzimidazole copolymers, all of which are new compositions of matter. The relative number of each benzimidizole unit in the polymer chain depends on the molar ratio of the dicarboxylic compounds used in the polymerization.

Example V illustrates the process of this invention utilizing a combination of a free dicarboxylic acid and the dimethyl ester of the same acid to form a polybenzimidazole, viz. poly-2,2′(-m-phenylene)-5,5′-bibenzimidazole.

EXAMPLE V

Into a three-necked, one liter, round bottomed flask, equipped with a nitrogen inlet and outlet, a mechanical stirrer attached to a torque measuring device and a condenser was placed 15.02 g(90.48 mmol) isophthalic acid, 17.55 g (90.46 mmol) dimethyl isophthalate (for a mol % ratio of free acid to dimethyl ester of 50:50), 38.68 g (180.75 mmol) 3,3′,4,4′-tetraaminobiphenyl and 2.25 g (7.26 mmol) triphenyl phosphite. The flask was degassed and filled with nitrogen. The degassing was repeated at least three times. The flask was then heated in an oil bath at 350° C./hr to 300° C. Stirring was maintained at 300 rpm until condensate evolution began to slow and torque on the stir motor had increased from 30 mV to approximately 120 mV. At this point agitation was terminated and the polymerizing mass allowed to foam. The oil bath temperature was held at 300° C. for 60 minutes. The resulting product was cooled to room temperature and ground. The inherent viscosity of this first-stage product (measured at 0.4% concentration in 97% sulfuric acid) was 0.17 dl/g. The ground prepolymer was placed in a flask, the degassing cycles described above were repeated, and the prepolymer heated with stirring at 60 rpm at 380° C. for 90 minutes. The resulting red-brown polybenzimdazole exhibited an inherent viscosity of 0.48 dl/g. The yield was 49 g (159.1 mmol) or 88%.

Examples VI, VII and VIII illustrate the process of this invention utilizing a combination of dimethyl and diphenyl esters of the same dicarboxylic acid to prepare a polybenzimidazole, viz. the same polymer as Example V.

EXAMPLE VI

The procedure of Example V was followed with a combination of dimethyl and diphenyl esters of the same dicarboxylic acid in 50:50 mol % ratio. The materials used were: diphenyl isophthalate (28.73 g, 90.35 mmol), dimethyl isophthalate (17.54 g, 90.41 mmol), 3,3',4,4'-tetraaminobiphenyl (38.68 g, 180.7 mmol) and triphenyl phosphite (2.30 g, , 7.42 mmol). The resulting first-stage prepolymer had an IV of 0.16 dl/g. The resulting second-stage polymer was dark gold and had an IV of 0.62 dl/g. The yield was 50.8 g (165 mmol) or 91%.

EXAMPLE VII

The procedure of Example VI was followed with about 75:25 mol % ratio of dimethyl to diphenyl ester. The materials used were: diphenyl isophthalate (14.37 g, 45.19 mmol), dimethyl isophthalate (28.29 g, 145.8 mmol), 3,3',4,4',- tetraaminobiphenyl (38.67 g, 180.7 mmol) and triphenyl phosphite (2.27 g, 7.32 mmol). The resulting first-stage prepolymer had an IV of 0.15 dl/g. The resulting second-stage polymer was dark gold and had an IV of 0.43 dl/g. and a plugging value, as measured in a 5% solution in 97% sulfuric acid, of 0.46 g/cm². The yield was 49.5 g (161 mmol) or 89%.

EXAMPLE VIII

The procedure of Example VI was followed with about a 90:10 mol % ratio of dimethyl to diphenyl ester. The materials used were: diphenyl isophthalate (5.79 g, 18.21 mmol), dimethyl isophthatalate (31.59 g, 162.8 mmol), 3,3',4,4'-tetraaminobiphenyl (38.67 g, 180.7 mmol) and triphenyl phosphite (2.30 g, 7.42 mmol). The resulting first-stage prepolymer had an IV of 0.16 dl/g. The resulting second-stage polymer was dark gold and had an IV of 0.42 dl/g. and a plugging value as measured in a 5% solution in 97% sulfuric acid, of 1.94 g/cm². The yield was 31.5 g (102 mmol) or 57%.

Examples IX to XII illustrate the preparation of the same polybenzimdazole as was prepared in Examples V to VIII using a combination of free dicarboxylic acid and a diphenyl ester of the same acid as the dicarboxylic component of the polymerization.

EXAMPLE IX

The procedure of Example V was followed with about a 50:50 mol % ratio of free acid to diphenyl ester. The materials used were: isophthalic acid (15.02 g, 90.41 mmol), diphenyl isophthalate (28.74 g, 90.29 mmol), 3,3',4,4'-tetraaminobiphenyl (38.67 g, 180.5 mmol) and triphenyl phosphite (2.26 g, 7.29 mmol). The first stage prepolymer had an IV of 0.20 dl/g. while the second stage polymer had and IV of 0.63. The yield was 55.0 g (179 mmol) or 99%.

EXAMPLE X

The procedure of Example IX was followed with about a 75:25 mol % ratio of free acid to diphenyl ester. The materials used were: isophthalic acid (22.50 g, 135.4 mmol), diphenyl isophthalate (14.38 g., 45.18 mmol) 3,3',4,4'-tetraaminobiphenyl (38.69 g., 180.6 mmol) and triphenyl phosphite (2.26 g, 7.29 mmol). The first stage prepolymer had an IV of 0.17 dl/g. while the second stage polymer had an IV of 0.42 dl/g. The yield was 54.6 g (177.0 mmol) or 98%.

EXAMPLE XI

The procedure of Example IX was followed with about a 90:10 mol % ratio of free acid to diphenyl ester. The materials used were isophthalic acid (27.00 g., 162.5 mmol), diphenyl isophthalate (5.75 g, 18.06 mmol), 3,3',4,4'-tetraaminobiphenyl (38.67 g. 180.5 mmol) and triphenyl phosphite (2.24 g, 7.26 mmol). The first stage prepolymer had an IV of 0.17 dl/g. while the second stage polymer had an IV of 0.49 dl/g. and a sulfuric acid PV of 1.4 g/cm². The yield was 52.7 g (171 mmol) or 95%.

EXAMPLE XII

The procedure of Example IX was followed with about a 95:5 mol % ratio of free acid to diphenyl ester. The materials used were isophthalic acid (28.51 g, 171.6 mmol), diphenyl isophthalate (2.90 g, 9.11 mmol), 3,3'4,4'-tetraaminobiphenyl (38.67 g, 180.7 mmol) and triphenyl phosphite (2.24 g, 7.23 mmol). the first stage prepolymer had an IV of 0.17 while the second stage propolymer had an IV of 0.50 and a sulfuric acid PV of 1.6. The yield was 51.2 g (166 mmol) or 92%.

Example XIII illustrates the process of this invention utilizing a dimethyl ester as the sole dicarboxylic compound.

EXAMPLE XIII

This example illustrate the formation of poly-2,2'-(naphthalene-2",6")-5,5'-bibenzimidazole using a dimethyl ester as the sole dicarboxylic component of the polymerization.

The procedure of Example V was followed using dimethyl-2, 6-naphthalenedicarboxylate as the sole dicarboxylic component except that the first stage was carried out at 340° C. for one hour. The materials used were dimethyl-2,6-naphthalenedicarboxylate (38.1 g, 157 mmol), 3,3'4,4'-tetraaminobiphenyl (33.79 g, 157.7 mmol) and triphenyl phosphite (1.95 g, 6.29 mmol). The first stage prepolymer had an IV of 0.27 dl/g. while the second stage polymer had an IV of 0.30 dl/g. and a sulfuric acid PV of 2.1 g/cm². The yield was 45.03 g (146.2 mmol) or 93%.

What is claimed is:

1. A two stage process for producing polybenzimidazoles comprising heasting in a first stage in a substantially oxygen-free atmosphere, a mixture of at least one aromatic hydrocarbon tetraamine containing two pairs of amine substituents on an aromatic ring in ortho position and dicarboxylic component consisting of at least one compound having the formula

in which R' is a divalent organic radical of the class consisting of an aromatic hydrocarbon ring, an alkylene group, and a heterocylic ring and may be the same or different in the various molecules making up the dicarboxylic component and the Y's may be hydrogen, aryl or alkyl with no more than 95% of the Y's being hydrogen or phenyl, said heating being sufficient to bring the mixture to condensation polymerization temperature above the melting point of said tetraamine, continuing the heating with agitation until the agitator torque is from about 1.5 to about 6 times the torque before the rise in viscosity begins, terminating the agitation while continuing to heat the reaction mixture to a temperature of from 230° to 350° C. while allowing the mass to foam, cooling to a friable foamed mass, crushing the mass to obtain a ground prepolymer and heating the ground prepolymer in a second stage in a substantially oxygen-free atmosphere at a temperature in excess of the highest temperature employed in said first stage with agitation until an inherent viscosity in excess of 0.37 is obtained.

2. The process of claim 1 wherin said dicarboxylic component is selected from the group consisting of (1) at least one free dicarboxylic acid and at least one diaryl ester of a dicarboxylic acid, (2) a combination of at least one free dicarboxylic acid and at least one dialkyl ester of a dicarboxylic acid, (3) a combination of at least one diaryl ester of a dicarboxylic acid and at least one dialkyl ester of a dicarboxylic acid; and (4) a dialkyl ester of a dicarboxylic acid.

3. The process of claim 2 wherein said dicarboxylic acid is aromatic, said aryl groups are phenyl, and said alkyl groups contain 1 to 5 carbon atoms.

4. The process of claim 3 wherein said aromatic tetraamine is 3,3'4,4'-tetraaminobiphenyl.

5. The process of claim 4 wherein said dicarboxylic component is phenylindandicarboxylic acid and diphenyl isophthalate.

6. The process of claim 4 wherein said dicarboxylic component is diphenic acid and diphenyl isophthalate.

7. The process of claim 4 wherein said dicarboxylic component is isophthalic acid and dimethyl isophthalate.

8. The process of claim 4 wherein said dicarboxylic component is isophthalic acid and diphenyl isophthalate.

9. The process of claim 4 wherein said dicarboxylic component is dimethyl isophthalate and diphenyl isophthalate.

10. The process of claim 4 wherein said dicarboxylic component consists of dimethyl 2,6-naphthalenedicarboxylate.

11. The process of claim 1 wherein a catalyst for the reaction is employed.

12. The process of claim 7 wherein said catalyst is triphenyl phosphite.

13. The process of claim 4 wherein said dicarboxylic component consists of dimethyl isophthalate.

14. As a new composition of matter a 2,2'(m-phenylene)-5,5'-bibenzimidazole/2,2'-(1"1"3"-trimethylindanylene-5"3"-p-phenylene-5,5'-bibenzimidazole copolymer.

15. As a new composition of matter, a 2,2'-(m-phenylene)-5,5'-bibenzimadazole/2,2'-(biphenylene-2"2''')-5,5'-bibenzimidazole copolymer.

16. The process of claim 1 wherein the mol ratio of said aromatic tetraamine to said dicarboxylic component is 1:1.

* * * * *